United States Patent [19]

Badger

[11] Patent Number: 4,799,555
[45] Date of Patent: Jan. 24, 1989

[54] CHISEL PLOW MOUNTING ASSEMBLY

[76] Inventor: Carl L. Badger, 8548 N. Elyria Rd., West Salem, Ohio 44287

[21] Appl. No.: 7,711

[22] Filed: Jan. 28, 1987

[51] Int. Cl.$^4$ ............................................. A01B 23/02
[52] U.S. Cl. ...................................... 172/751; 172/762
[58] Field of Search ............... 172/751, 750, 753, 749, 172/762

[56] References Cited

U.S. PATENT DOCUMENTS

| | | | |
|---|---|---|---|
| 206,723 | 8/1878 | Gilleland | 403/95 |
| 718,041 | 1/1903 | Willbanks et al. | 172/751 |
| 902,770 | 11/1908 | Spinner | 172/751 |
| 1,005,501 | 10/1911 | Baum | 172/751 |
| 1,168,469 | 1/1916 | Benson | 172/703 |
| 1,169,879 | 2/1916 | Smith et al. | 172/751 |
| 1,173,985 | 2/1916 | Schulze et al. | 172/751 |
| 1,201,296 | 10/1916 | Hendricks | 172/751 |
| 1,273,621 | 7/1918 | Kirkpatrick | 172/751 X |
| 1,346,751 | 7/1920 | Herring | 172/751 |
| 1,356,723 | 10/1920 | Kaupke | 172/751 |
| 1,359,663 | 11/1920 | Boda | 172/751 |
| 2,097,354 | 10/1937 | Thompson | 172/753 X |
| 2,877,061 | 3/1959 | Blackwood | 172/753 |
| 3,061,021 | 10/1962 | Shader | 172/750 |
| 3,117,825 | 1/1964 | Loch | 172/749 |
| 3,220,489 | 11/1965 | Repka | 172/750 |
| 3,563,318 | 2/1971 | Eberhardt | 172/750 |
| 4,078,615 | 3/1978 | Kelly | 172/711 |

*Primary Examiner*—Richard J. Johnson
*Attorney, Agent, or Firm*—Reese Taylor

[57] ABSTRACT

A mounting assembly for attaching a chisel plow share to a standard comprises a first bracket slidable over the standard and including hooks for engaging the share; a second bracket slidable over the standard and also including hooks for engaging the share and a locking assembly mounted on the standard for drawing the share into tight engagement with the standard and the brackets.

6 Claims, 1 Drawing Sheet

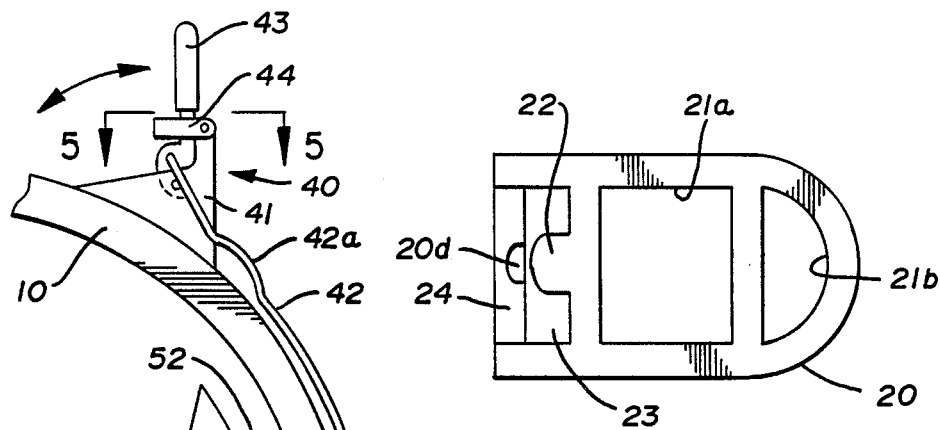
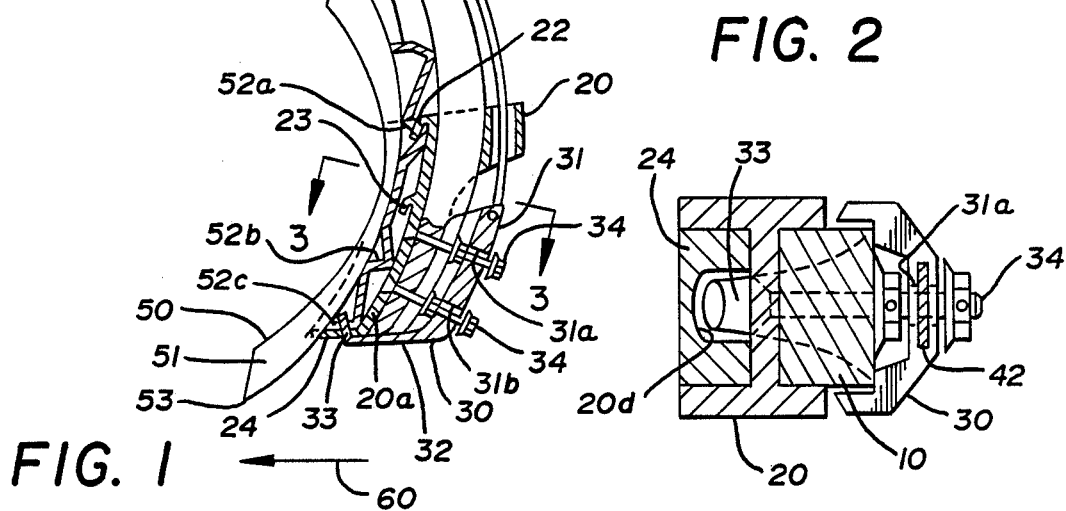
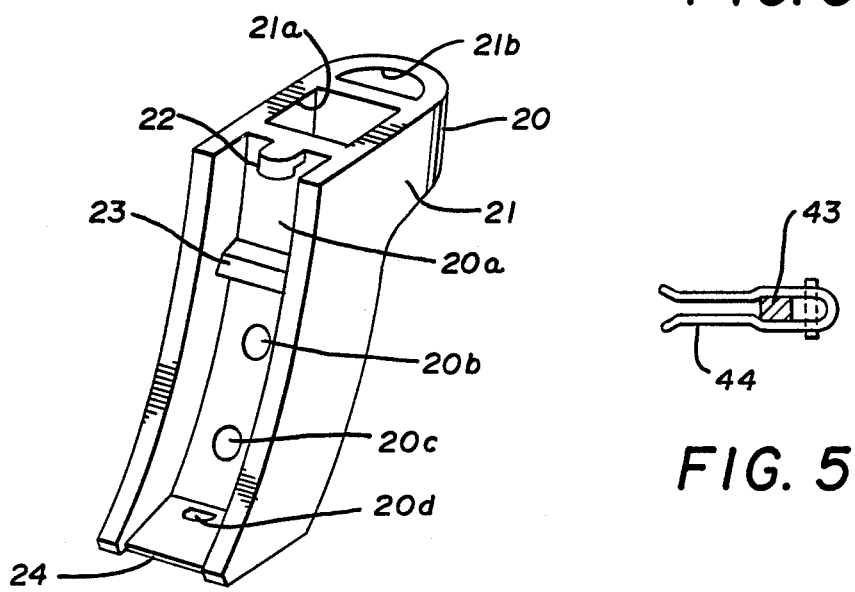
FIG. 1
FIG. 2
FIG. 3
FIG. 4
FIG. 5

CHISEL PLOW MOUNTING ASSEMBLY

BACKGROUND OF THE INVENTION

This invention relates, in general, to the mounting of agricultural implements, such as plow shares, and relates, in particular, to the mounting of a chisel plow or similar implement on a plow standard whereby the share can be readily and easily replaced without the utilization of any tools once initially attached.

DESCRIPTION OF THE PRIOR ART

The prior art discloses many different plow shares and tilling devices which can be mounted on the standards of various apparatus intended to be towed behind a tractor to cultivate soil.

These implements take various forms and shapes, depending upon the particular cultivation task for which they are intended.

This particular invention is directed primarily to such an implement commonly known as a chisel plow, but is not intended to be so limited, since the inventive principles disclosed may have utility with other agricultural implements. Nevertheless, the description and discussion of the invention contained herein will refer, primarily, to chisel plows for simplicity.

Accordingly, then, chisel plow generally, in the most basic prior art, are mounted on a standard by means of a bolt and nut attachment which firmly draws the chisel plow into engagement with the standard so as to make it stable as it is drawn through the earth by the towing vehicle.

These plows, of course, wear and brake during use and it is often necessary to remove and replace them. The practical difficulty that is often encountered is that these devices are exposed to the weather and to rough use and, typically, they will fail in the field at a remote location. This necessitates carrying the tools necessary to make the change which, because of the nature of the environment in which these devices are used, presents obvious problems.

Accordingly, it is believed desirable to provide what might be called a tool-free attachment wherein the share is firmly attached to the standard for operational purposes, but wherein it can be removed and replaced readily and quickly without the utilization of any special tools.

The prior art discloses a number of approaches to this general problem. For example, the patent art, as shown by Hendricks U.S. Pat. No. 1,201,296, discloses a standard which receives a socket or bracket and has a share attached to that socket or bracket by locking slots and a clamping lever which engages studs in the slots to pull the share inwardly and rearwardly to secure it to the standard.

Boda U.S. Pat. No. 1,359,663 is somewhat similar wherein a bracket is slipped over the standard and the plow share has bolts which are engaged in keyhole slots in the bracket and a toggle-type lever or link is employed to lock the two together.

Schulze U.S. Pat. No. 1,173,985 discloses a toggle lever arrangement wherein the share has studs which engage a bracket and wherein the toggle is employed to lock the same together.

Spinner U.S. Pat. No. 902,770 also shows the utilization of an eccentric cam and lever arrangement, engaging a pin on the plow share to eliminate the usual bolts.

Baum U.S. Pat. No. 1,005,501 is similar in that it also eliminates the use of bolts by employing an eccentric and a lever.

These patents, accordingly, disclose more or less quick disconnect arrangements which largely eliminate the requirement for the use of tools.

However, these really are somewhat complex structures and, in addition to the initial expense of fabricating the same, are believed to present some inherent disadvantages in actual field operation.

SUMMARY OF THE INVENTION

It is, accordingly, an object of this invention to provide a quick disconnect assembly wherein a chisel plow or similar implement can be readily and quickly attached to the standard of a conventional cultivating device without the utilization of tools, but without sacrificing stability or security in the mounting or attachment arrangement.

To this end, it has been found that such a device can be produced if a first bracket is provided which slides over the standard and if a second bracket is provided which also slides over the standard beneath the first bracket for engagement therewith.

First attachment means can then be carried by the first bracket for engaging the share at one point, while second attachment means are carried by the second bracket for engaging the share at an opposed point. First locking means are provided for engaging the first bracket, second bracket and the standard and second locking means are provided wherein, without the use of tools, the engagement between the share and the first and second attachment means can be activated, or deactivated, to permit easy and ready replacement of the share.

This arrangement can be applied either as original equipment or as a retrofit package.

Accordingly, production of an improved chisel plow mounting assembly of the type above-described becomes the principal object of this invention, with other objects thereof becoming more apparent upon a reading of the following brief specification considered and interpreted in view of the accompanying drawings.

OF THE DRAWINGS

FIG. 1 is a side elevational view, partially in section, showing the improved mounting assembly in its assembled condition.

FIG. 2 is a top plan view of the first bracket.

FIG. 3 is a sectional view taken along the line 3—3 of FIG. 1.

FIG. 4 is a perspective view of the first mounting bracket.

FIG. 5 is a sectional view taken along the line 5—5 of FIG. 1.

BRIEF DESCRIPTION OF THE PREFERRED EMBODIMENTS

Referring, first, to FIG. 1 of the drawings, it will be noted that FIG. 1 illustrates a completed assembly in place showing, however, only the standard of the basic cultivtion apparatus which would include many other features, including wheels, etc., all of which will be well-known to those of ordinary skill in this art.

Referring, still, to FIG. 1, then, it will be noted that the assembly generally includes a standard 10 which is conventional and part of the normal cultivating device; a first bracket 20; a second bracket 30; and locking means 40, all of which are designed to engage the standard and the plow share 50.

Referring next to FIGS. 1, 2 and 3 of the drawings, it will be seen that the bracket 20 has an enlarged body portion 21 with a through opening 21a which is slidable over the standard 10, as clearly shown in FIG. 1 of the drawings. When in place, part of body portion 21 projects beyond the rear of standard 10 and the front face 20a of the bracket lies along the front face of the standard 20. The portion of body 21 which projects beyond the rear of the standard 10 also has a second through passageway 21b which receives part of the locking means 40, as will be described below.

On the front fact 20a of the bracket 20, first attachment means 22 are disclosed and take the form of a hookshaped member extending outwardly and downwardly from that face of the bracket 20 for engagement with the share as will be described. A second attachment hook 23 is also provided for purposes which will also be described below.

First bracket 20 also has through apertures 20b and 20c for the receipt of suitable bolts and a third aperture 20d in floor 24 for receipt of certain attachment means carried on the second bracket 30 as will be described below. Finally, opposed sidewalls project forwardly of front face 20a for lateral stability when the assembly is in place as will be apparent.

The second bracket 30 also is receivable on the standard 20. This bracket includes a first body portion 31 and a second body portion or base 32. The first body portion 31 fits against the rear surface of the standard 10, while the second body portion or base 32 fits beneath that member and beneath floor 24 of the first bracket. Second body portion 32 also terminates in attachment means 33 which take the form of a hook-shaped member which is designed to engage the share through aperture 20d in floor 24 of the first bracket, as will be described.

The first bracket 20 and second bracket 30 are secured to the standard 10 by means of bolts 34,34 which form a first locking means and which pass through suitable apertures 20b,20b in the first bracket, the conventional apertures in standard 10 and enlarged apertures 31a,31a in the second bracket 30 and which can be secured together so as to hold these three members together as shown in FIGS. 1 and 3.

The second locking means 40 consist of an over center toggle arrangement having a mounting bracket 41 secured to the standard, an operational spring steel connector strap 42 which extends from the handle 43 through aperture 21b of first bracket 20 to the second bracket 30 and which has an arcuate actuating flex hump 42a therein. The arrangement is such that movement of lever 43 toward the rear of standard 10 will lock these means while movement in the opposite direction will unlock them.

Since the normal path of movement is in the direction of arrow 60 and locking movement of lever 43 is opposite that direction, it is believed that inadvertent unlocking is unlikely. However, further assurance in this regard can be obtained by providing spring clip 44 on housing 41 so that the lever 43 can be securely held in the locked position of FIG. 1.

The share 50 includes the normal blade 51 with a mounting support member 52 on its rear side which can either be case unitary therewith or welded thereto. This support member 52 includes a plurality of apertures in shoulders 52a, 52b and 52c which are intended to receive the first attachment means 22 of the first bracket 20 and the second attachment means 33 of the second bracket 30 as can be seen in FIG. 1 wherein attachment means 22 engage shoulder 52a and attachment means 33 engage shoulder 52c.

In use or operation of this device, it will be seen that the first bracket 20 will be slipped over the standard 10, as will be the second bracket 30. The standard and the first and second brackets will then be secured together by means of the bolt and nut arrangement 34,34.

The share 50 is then inserted between the first attachment means 22 of first bracket 20 and the attachment means 33 of the second bracket 32, so that these attachment hooks engage the support member 52 of the share 50. Actuation of the second locking means 40, by moving the handle 43 to the rear or FIG. 1 position, will draw the bracket 30 upwardly and will pull the share back and up so that it is firmly affixed to the standard 10. The oversize configuration of apertures 31a and 31b permit this movement of second bracket 30 relatively of bolts 34,34. No tools, whatsoever, are required to accomplish this.

When the point 53 of the share 50 becomes dull or damaged, it can be reversed by moving lever 43 forwardly to release the engagement between attachment members 22 and 33. The share can then be disengaged from hooks 22 and 33 and reversed and the mounting member 51 then being reengaged with the hooks 22 and 33. For example, in this instance, attachment means 22 would engage shoulder 52c and attachment means 33 would engage shoulder 52a.

Thus, it will be seen that reversal or replacement of the share can be quickly and easily accomplished without the utilization of any tools.

It will also be noted that the provision of floor 24 beneath shoulder 52c or 52 as the case may be, provides improved stability since it will resist downward movement of the share 50.

It will also be apparent that the assembly can be furnished as original equipment or used to retrofit existing standards.

While a full and complete description of the invention has been set forth in accordance with the dictates of the Patent Statutes, it should be understood that modifications can be resorted to without departing from the spirit hereof or the scope of the appended claims.

It will thus be noted that the first bracket 20 has a second engagement hook 23 disposed below first hook 22. While a typical twisted share 50 has been illustrated, so called sweep hooks are also commonly used. These hooks are shorter and do not extend up the standard as far as the share illustrated in the drawings. When such a share is employed, the second hook 23 would engage the upper end of the bracket and the remaining apparatus would operate as already described. Thus, the mounting assembly has utility with a variety of shares.

What is claimed is:

1. A mounting assembly for attaching a chisel plow share or the like to a plow standard, comprising:
   (a) a first bracket releasably mounted over the projecting end of the standard with a portion of said bracket surrounding the standard and a portion thereof engaging a forward surface thereof;
   (b) a second bracket movably and releasably mounted on the standard and engaging the rear surface thereof;
   (b') a mounting support member secured to the share;

(c) first attachment means carried by said first bracket for releasable engagement with the mounting support member,
(d) second attachment means carried by said second bracket for releasable engagement with the mounting support member;
(e) first locking means for rigidly interconnecting said first bracket and the standard; and
(f) second locking means carried by the second bracket and being movable between locking and unlocking positions by drawing said second bracket upwardly along the standard for locking said share to the standard.

2. The mounting assembly of claim 1 wherein said second locking means include an over the center toggle lock mounted on the standard axially above said first bracket.

3. The mounting assembly of claim 2 wherein said second locking means are movable between locked and unlocked positions; and third locking means are mounted on the standard for releasably retaining said second locking means in locked position.

4. The mounting assembly of claim 1 wherein said first and second attachment means include hook-like projections from said first and second brackets; and said mounting support member includes a plurality of apertures for receipt of said hook-like projections.

5. The mounting assembly of claim 1 wherein said first bracket includes a base disposed beneath said mounting support member when said first and second attachment means are engaged therewith.

6. The mounting assembly of claim 5 wherein said base of said first bracket includes a through aperture therein; said second attachment means of said second bracket is insertable through said aperture for engagement with said mounting support member.

* * * * *

UNITED STATES PATENT AND TRADEMARK OFFICE
CERTIFICATE OF CORRECTION

PATENT NO. : 4,799,555

DATED : January 24, 1989

INVENTOR(S) : Badger

It is certified that error appears in the above-identified patent and that said Letters Patent is hereby corrected as shown below:

In Column 1, Line 61, between "1,173,985" and "discloses", insert the word --also--.

In Column 2, Line 62, delete "cultivtion" and substitute therefor --cultivation--.

In Column 3, Line 10, delete the numeral "20" and substitute therefor --10--.

In Column 3, Line 29, delete the numeral "20" and substitute therefor --10--.

Signed and Sealed this

First Day of August, 1989

Attest:

DONALD J. QUIGG

Attesting Officer

Commissioner of Patents and Trademarks